US007035223B1

(12) United States Patent
Burchfiel et al.

(10) Patent No.: US 7,035,223 B1
(45) Date of Patent: Apr. 25, 2006

(54) METHOD AND APPARATUS FOR DETECTING UNRELIABLE OR COMPROMISED ROUTER/SWITCHES IN LINK STATE ROUTING

(76) Inventors: Jerry D. Burchfiel, 456 Belmont St., Unit 18, Watertown, MA (US) 02174; Brig Barnum Elliott, 25 Wollaston Ave., Arlington, MA (US) 02476; Anthony Michel, 52 Hancock St., Lexington, MA (US) 02420

( * ) Notice: Subject to any disclaimer, the term of this patent is extended or adjusted under 35 U.S.C. 154(b) by 0 days.

(21) Appl. No.: 09/533,467

(22) Filed: Mar. 23, 2000

(51) Int. Cl.
   *H04L 12/66* (2006.01)
(52) U.S. Cl. .................................... 370/248; 370/338
(58) Field of Classification Search ............... 370/248, 370/249, 255, 254, 338; 713/200, 201
   See application file for complete search history.

(56) References Cited

U.S. PATENT DOCUMENTS

| | | | | |
|---|---|---|---|---|
| 4,718,002 A | | 1/1988 | Carr .......................... 364/200 |
| 5,093,824 A | | 3/1992 | Coan et al. .................. 370/16 |
| 5,243,592 A | | 9/1993 | Perlman et al. .............. 370/17 |
| 5,623,357 A | * | 4/1997 | Kight et al. ................ 359/135 |
| 5,850,592 A | | 12/1998 | Ramanathan ................. 455/7 |
| 5,881,246 A | | 3/1999 | Crawley et al. ....... 395/200.68 |
| 5,913,921 A | | 6/1999 | Tosey et al. ................ 709/220 |
| 5,943,314 A | * | 8/1999 | Croslin ...................... 370/216 |
| 5,964,841 A | * | 10/1999 | Rekhter ..................... 709/242 |
| 5,991,264 A | * | 11/1999 | Croslin ..................... 370/225 |
| 6,028,857 A | | 2/2000 | Poor ......................... 370/351 |
| 6,292,463 B1 | * | 9/2001 | Burns et al. ................ 370/216 |
| 6,484,202 B1 | * | 11/2002 | LeDuc ....................... 709/224 |
| 6,564,341 B1 | * | 5/2003 | Sundaram et al. ............ 714/43 |
| 2002/0186654 A1 | * | 12/2002 | Tomar ....................... 370/225 |

OTHER PUBLICATIONS

"Analysis of Routing Strategies for Packet Radio Networks," J.J. Garcia Lune Aceves et al., Proc. Of the IEEE INFOCOM '85, Washington, DC, Mar. 1985, 292-302.

"The DARPA Packet Radio Network Protocols," J. Jubin et al., Proc. of the IEEE, vol. 75, No. 1, Jan. 1987, pp. 21-32.

(Continued)

*Primary Examiner*—Ricky Ngo
*Assistant Examiner*—Derrick W Ferris
(74) *Attorney, Agent, or Firm*—Fish & Neave IP Group Ropes & Gray LLP

(57) ABSTRACT

Method and apparatus for detecting whether router status information sent from a first router is unreliable, includes structure and/or steps for storing a router status database. Structure and/or steps are provided for receiving a first signal corresponding to a first router status message sent by the first router, the first router status message containing router status information indicative of the status of communication between the first router and a second router. Further, structure and/or steps are provided for issuing an alarm signal if the signal comparison reveals that the first and second router status messages contain non-complementary router status information. Such information can be flooded through the network to isolate the unreliable/compromised router.

23 Claims, 5 Drawing Sheets

OTHER PUBLICATIONS

"Link-State Routing," John Moy, Ch. 5, "Routing in Communications Networks," ed. Martha Steenstrup, Prentice Hall, 1995.

"Packet Radio Routing," Gregory S. Lauer, Ch. 11, "Routing in Communications Networks," ed. Martha Steenstrup, Prentice Hall, 1995.

"Packet Radio Network Routing Algorithms: A Survey," J.J. Hahn et al., IEEE Communications Magazine, vol. 22, No. 11, Nov. 1984, pp. 41-47.

"The Organization of Computer Resources into a Packet Radio Network," R.E. Kahn, IEEE Trans. On Communications, vol. COM-25, No. 1, Jan. 1977, pp. 169-178.

* cited by examiner

METHOD AND APPARATUS FOR DETECTING UNRELIABLE OR COMPROMISED ROUTER/SWITCHES IN LINK STATE ROUTING

BACKGROUND OF THE INVENTION

1. Field of the Invention

The present invention relates to method and apparatus for detecting unreliable and/or compromised router/switches in a network by utilizing the redundancy of Link State routing protocols.

2. Related Art

Ad hoc wireless network systems, for example municipal or military radio communication systems (such as the Near Term Digital Radio proposed by the U.S. Army), typically route messages between mobile transceivers and routers. To efficiently manage message flow in the network, it is important for each router to have knowledge of the traffic in the network, and, in particular, the state of the links between the routers themselves, and between the routers and the mobile transceivers. The routers can then efficiently direct message flow to ensure overall system reliability and responsiveness. Thus, Link State routing information must be transmitted between the routers.

In existing wireless ad hoc networks, all of the nodes are equipped with wireless communication transceivers; some of the nodes are capable of network routing functions ("routers"), but others are merely sources or destinations for data traffic ("end points" such as radio transceivers). All nodes execute a set of algorithms and perform a set of networking protocols that enable each node to find the other nodes, to determine paths through the network for data traffic from source to destination, and to detect and repair ruptures in the network as the nodes move, fail, change battery-power, or communications path characteristics change over time (e.g. multipath distortions).

It is known to employ link state routing as a means of distributing routing information through the network to enhance traffic management. Link state routing is a well-known routing mechanism and will not be described in detail herein. See, for example, as described in technical articles including: "Packet Radio Routing," by Gregory S. Lauer in Chapter 11 of "Routing in Communication Networks", ed. Martha Steenstrup. Prentice-Hall 1995; "Packet Radio Network Routing Algorithms: A Survey," by J. Hahn and D. Stolle, IEEE Communications Magazine, Vol. 22, No. 11, November 1984, pp. 41–47; "The Organization of Computer Resources into a Packet Radio Network," by R. E. Kahn, IEEE Trans. On Communications, Vol. COM-25, No. 1, January 1977, pp. 169–178; "Analysis of Routing Strategies for Packet Radio Networks," by J. Garcia-Luna-Aceves and N. Shacham, Proc. Of the IEEE INFOCOM '85, Washington, D.C., March 1985, 292–302; and "The DARPA Packet Radio Network Protocols," by J. Jubin and J. Tornow, Proc. Of the IEEE, Vol. 75, No. 1, January 1987, pp. 21–32. See also U.S. Pat. Nos. 4,718,001; 5,243,592; 5,850,592; 5,881,246; and 5,913,921 for the general state of the art in wireless network message routing.

FIG. 1 shows a sample network topology. The circles ("nodes") in this figure represent network routers. The lines ("links") represent communications channels. Thus, Router A is directly connected to routers B, C, D, and E, and these are called A's "neighbors." Again referring to FIG. 1, we see that Router B has neighbors A and C, that Router E has neighbors A and J, and so forth.

FIG. 2 displays a selected subset of the proper router status messages for the sample network topology. These router status messages, as illustrated, are a simplified form of the standard link-state routing updates that are commonly used in computer networking. (The simplifications are for expository clarity only; they do not affect the substance of this invention.)

We see that in link-state routing, each router is required to issue a router status message that (a) identifies the router that is reporting this information, and (b) lists all the neighbor routers for this report. Thus we have selected two status messages—one from router A and one from router B. As can be seen, each message identifies the reporting node and lists that node's neighbors.

These modern information networks can be attacked or degraded in a variety of ways including physically capturing a router and reconfiguring it to give out false router updates, or remotely penetrating the router and reconfiguring its router database with false information. Once the router is compromised, one method to disrupt the network involves creating false routing control traffic within the network so that user traffic is mis-routed or discarded. This type of attack can often be blocked or mitigated by physically securing access to the network routers and/or switches. However, in some open architecture networks, or in other situations in which routers/switches are in a semi-public place and cannot be effectively secured by purely physical means, additional techniques must be employed to help safeguard against such types of attacks. Even where the routers can be physically secure, the router may be attacked by remote insertion of false/corrupted data or viruses. In non-attack scenarios, certain routers/switches may degrade and become unreliable enough to introduce false routing information into the network. In these circumstances also, techniques must be found to identify the unreliable or compromised router and to isolate it and re-route network traffic.

Current Link State routing protocols include a redundancy feature in which each active router or switch ("node") within a network is responsible for issuing reports ("routing updates") on the current status of the communication links from that node to its neighboring nodes. The redundancy feature utilizes complementary reports between communicating links. Typically, each such report contains the information on the "simplex" link state, i.e., the state of the communication link from the reporting node to a neighbor node. However, each such report typically does not include information corresponding to the link from that neighbor back to the reporting node. This report contains routing update information including such fields as the reporting node's identifying number, its network address, identifiers for its communication links, the current state of the link (operational, in loopback, etc.), and one or more metrics for each link that indicate the suitability of that link for various types of message traffic. These reports are issued both periodically and on an event-driven basis, for example, when a link is first made operational, when it is removed from service, when it's metrics change, and so forth.

Although Link State routing protocols treat each communication link as a pair of independent simplex links, in reality the communications between the node and its neighbor are almost invariably bi-directional and act as a single, integrated link within the network architecture. In other words, in normal operation, router 10 reports that it has a functioning link to its neighbor router 12 "if and only if" router 12 correspondingly reports that it has a functioning link to router 10. This redundancy feature is exploited in the present invention. Note that the "if and only if" statement may be briefly false when the links change their state, since the two reporting routers are typically not synchronized and hence their updates will propagate through the entire network at slightly different times. After this short interval of dis-coordination, however, the statement will become true once again.

Thus, what is needed is a way to guard a network against an unreliable, degraded, or compromised router/switch, and preferably a way that utilizes the redundancy feature in Link State protocols.

SUMMARY OF THE INVENTION

The present invention exploits the redundancy in the Link State routing protocols to detect and counter incorrect routing updates received from unreliable or compromised routers/switches. In particular, one feature of the present invention is to compare the routing updates sent from a given router (the routing updates that describe a given link from that router to its neighbor router) with a corresponding update from that neighbor. If these two reports are inconsistent or non-complementary, the router reports a potential attack, and the network may change the network routing or forwarding behavior in response. In the steady state, even if a group of N routers are subverted and work in collusion, this method will quickly identify the inconsistency in link state information around the boundary of the subverted group, and raise a penetration alarm and reroute network traffic.

According to a first aspect of the present invention, a method and apparatus for detecting whether router status information sent from a first router is unreliable, includes structure and/or steps for storing a router status database. Structure and/or steps are provided for receiving a first signal corresponding to a first router status message sent by the first router, the first router status message containing router status information indicative of the status of communication between the first router and a second router. Structure and/or steps are also provided for comparing the received first signal with a second signal stored in the router status database. The second signal corresponds to a second router status message sent by the second router; the second router status message containing router status information indicative of the status of communication between the second router in the first router. Further, structure and/or steps are provided for issuing an alarm signal if the signal comparison reveals that the first and second router status messages contain non-complementary router status information. Preferably, unreliable or compromised router/switches are quickly detected because any router communicating with the unreliable/compromised router will not report the same router updates as the unreliable/compromised router.

According to another aspect of the present invention, a method and apparatus for detecting whether router status information sent from a first router is unreliable, comprises structure and/or steps for storing a router status database. Structure and/or steps are provided for receiving a first signal corresponding to a first router status message sent by the first router, the first router status message containing router status information indicative of the status of communication between the first router and a second router. Structure and/or steps are also provided for comparing the received first signal with a second signal stored in said router status database, the second signal corresponding to a second router status message sent by the second router, the second router status message containing router status information indicative of the status of communication between the second router in the first router. Finally, structure and/or steps are provided for issuing an alarm signal if the signal comparison reveals that the first and second router status messages contain non-complementary router status information.

DETAILED DESCRIPTION OF THE PREFERRED EMBODIMENTS

The present invention will be described with respect to common wireless network systems, such as municipal (police, fire, transportation, etc.) or military (aircraft, ground vehicle, naval craft, etc.) radio communications networks. However, other wired or wireless network systems may utilize the features of the present invention, for example, inter- or intra-store wireless inventory networks, in-plant manufacturing control networks, emergency wireless networks, inter- or intranet applications, and any type of computer network that employs link state routing. Such networks may be commonly found in business, telecommunications firms, government offices, and so forth, using well-known commercial technology such as Ethernets, Cisco routers, and so forth.

Briefly, the preferred embodiment exploits the "if and only if" redundancy of Link State routing protocols to detect when one router in the network is issuing false or unreliable reports about its links. The preferred method is straightforward, and can be exploited by every router in the network in a distributed manner, by some subsets of the routers, or by one or more specialized routers that are performing more or less centralized checking of the network routing updates. As used herein, "router" shall refer to routers, switches, and other network nodes which route or switch network messages.

Figure 1:
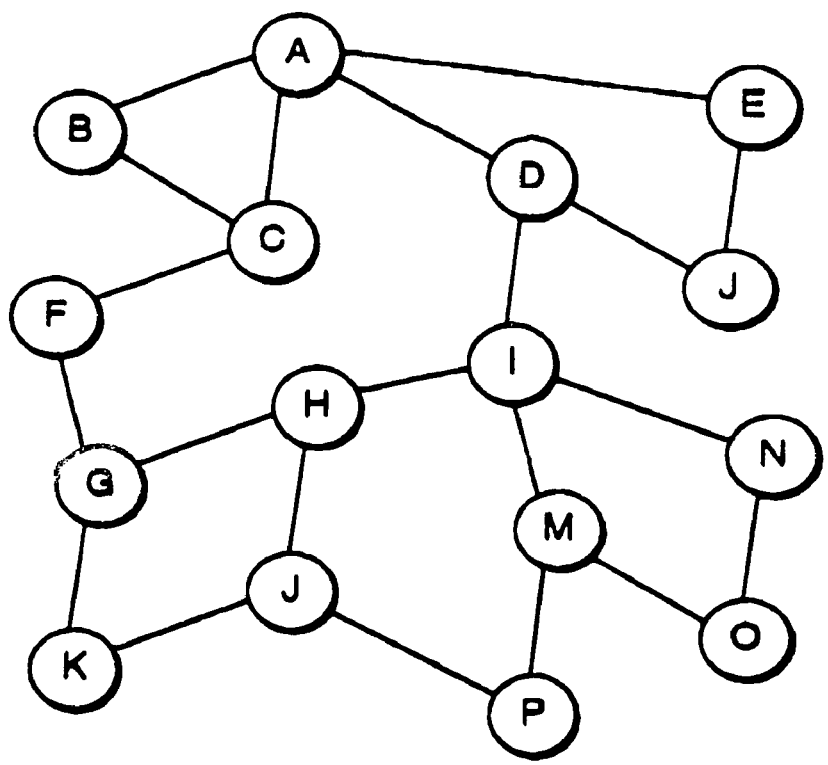
FIG. 1 depicts a notional network topology.
Figure 2:
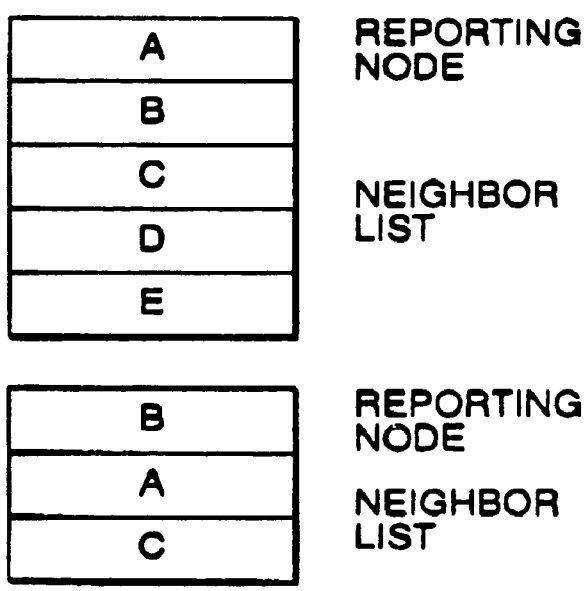
FIG. 2 displays a selected subset of the router status update messages for the network topology of FIG. 1.
Figure 3:
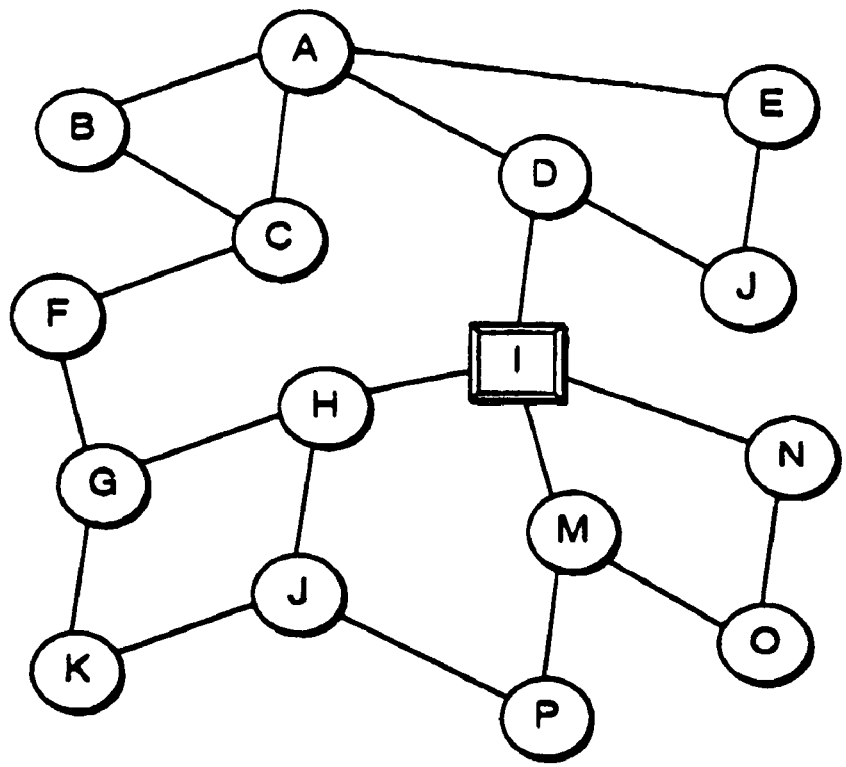
FIG. 3 shows the FIG. 1 network topology in a compromised state.

In more detail, FIG. 3 shows the same sample network topology as does FIG. 1, but in this case one of the nodes (I) has become compromised or unreliable. As one example, an enemy has seized this router and is using it to deliberately inject bad routing information into the network. As another example, the router is simply malfunctioning and accidentally generating bad routing information.

Figure 4:
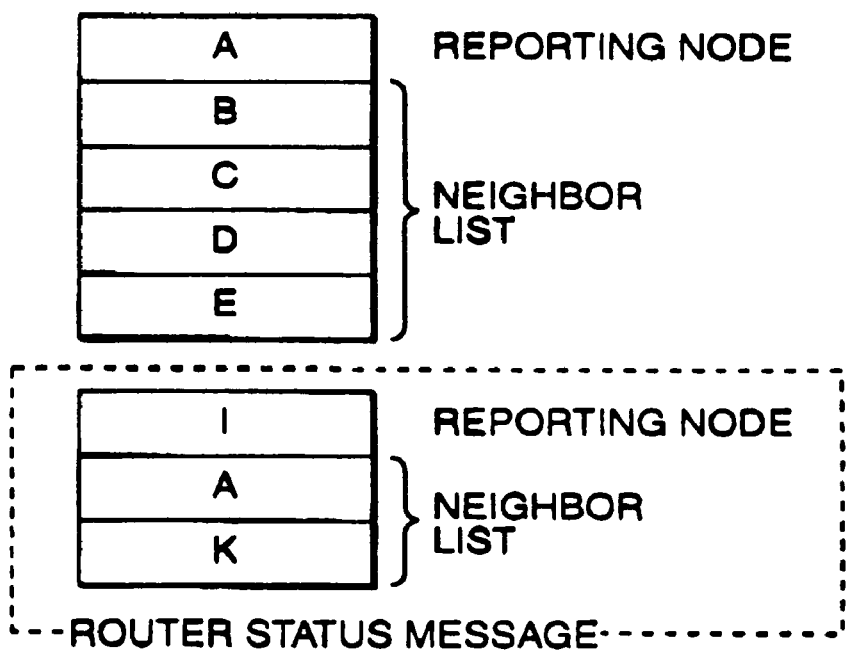
FIG. 4 shows two router status messages for the scenario illustrated in FIG. 3.

FIG. 4 shows two selection router status messages for the scenario illustrated in FIG. 3. Here we see that Router A continues to generate correct routing information, as in the previous example. However Router I is now generating spurious information. In particular, it is listing routers A and K as neighbors, when in fact neither one is a neighbor.

In basic terms, the preferred embodiment checks for and eliminates this false routing information by comparing the router status messages from a reporting node and those issued by its neighbors. For example, the status of router I is verified by (a) looking up each router listed as a neighbor in that message, and (b) checking that that router also reports that Router I is its own neighbor. In this example, it can be quickly determined that although Router I claims Router A as a neighbor, the opposite is not true. This inconsistency is apparent because the router status message from Router I or from Router A, or both, is false.

Figure 5:
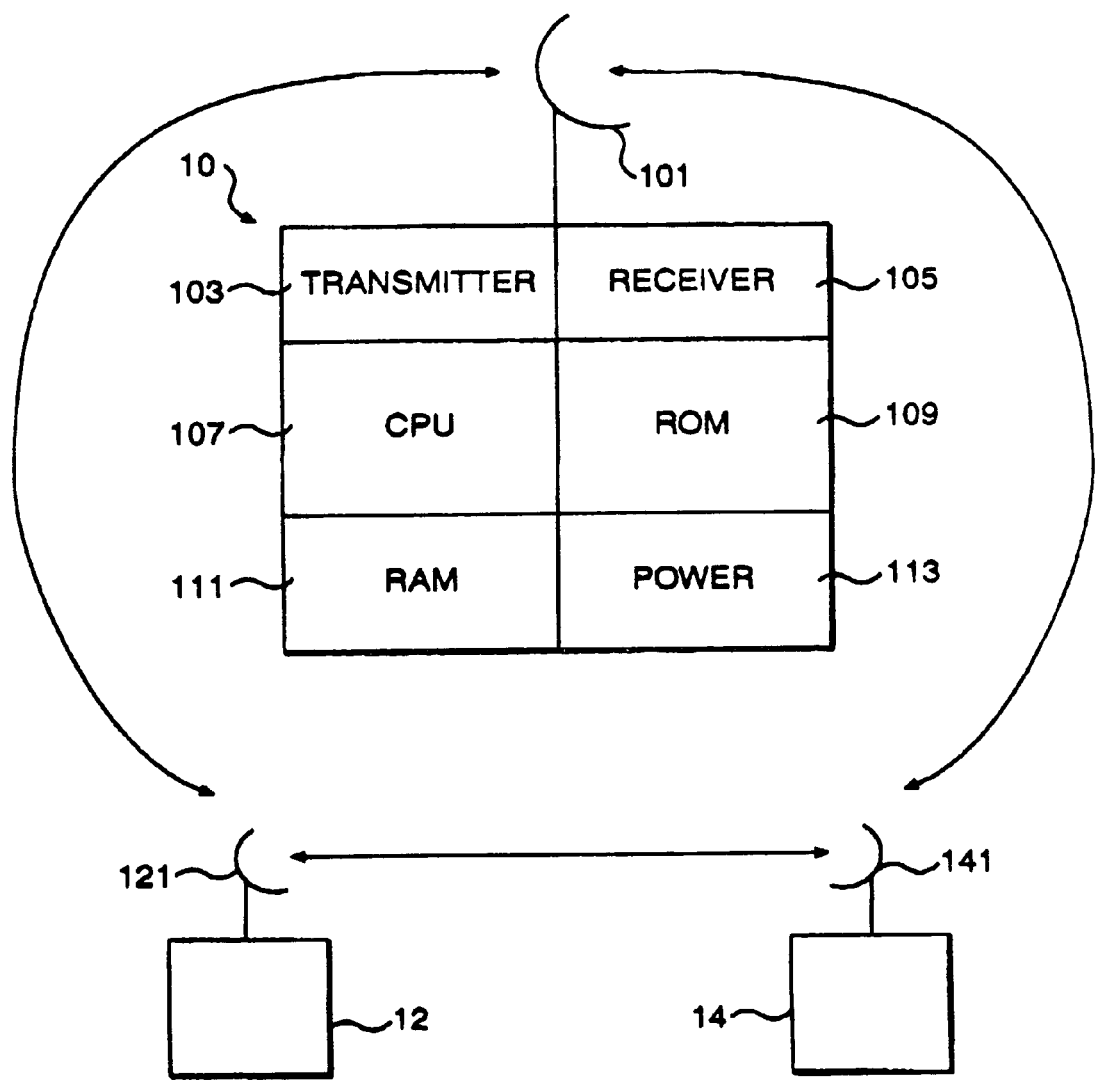
FIG. 5 is a schematic block diagram depicting routers in a wireless network according to a preferred embodiment of the present invention.

FIG. 5 depicts a schematic diagram of routers in a wireless network according to the preferred embodiment. Three routers 10, 12, and 14 are depicted as constituting the wireless network. Each router has an antenna 101, 121, and 141. Moreover, each router has the structure depicted in the detail of router 10, i.e. a transmitter 103, a receiver 105 (although a common transceiver may be used), and a processor. The processor can be any known type of router processor and may, for example, comprise a CPU 107, a ROM 109, a RAM 111, and a power source 113. However, those of ordinary skill in the communications art realize that any known router architecture may be utilized in accordance with the present invention.

Referring to FIG. 5, the router 10 receives router update reports from each of the router 12 and the router 14. Each report contains information regarding the status of all network links, and particularly the link 16. The report status includes, for example, the reporting router's identifying number, its network address, identifiers for its communication links, the current operational state of the link, and one or more metrics for the link, etc. The processor in router 10 stores these updates at appropriate locations in its router database inside RAM 111. As will be describe in more detail below, the CPU 107 compares the stored updates from both the routers 12 and 14 to see if they are reporting complementary data about the state of communications over link 16. If non-complementary data is discovered, there is a possibility that one of the routers 12 or 14 is unreliable and/or compromised.

Figure 6:
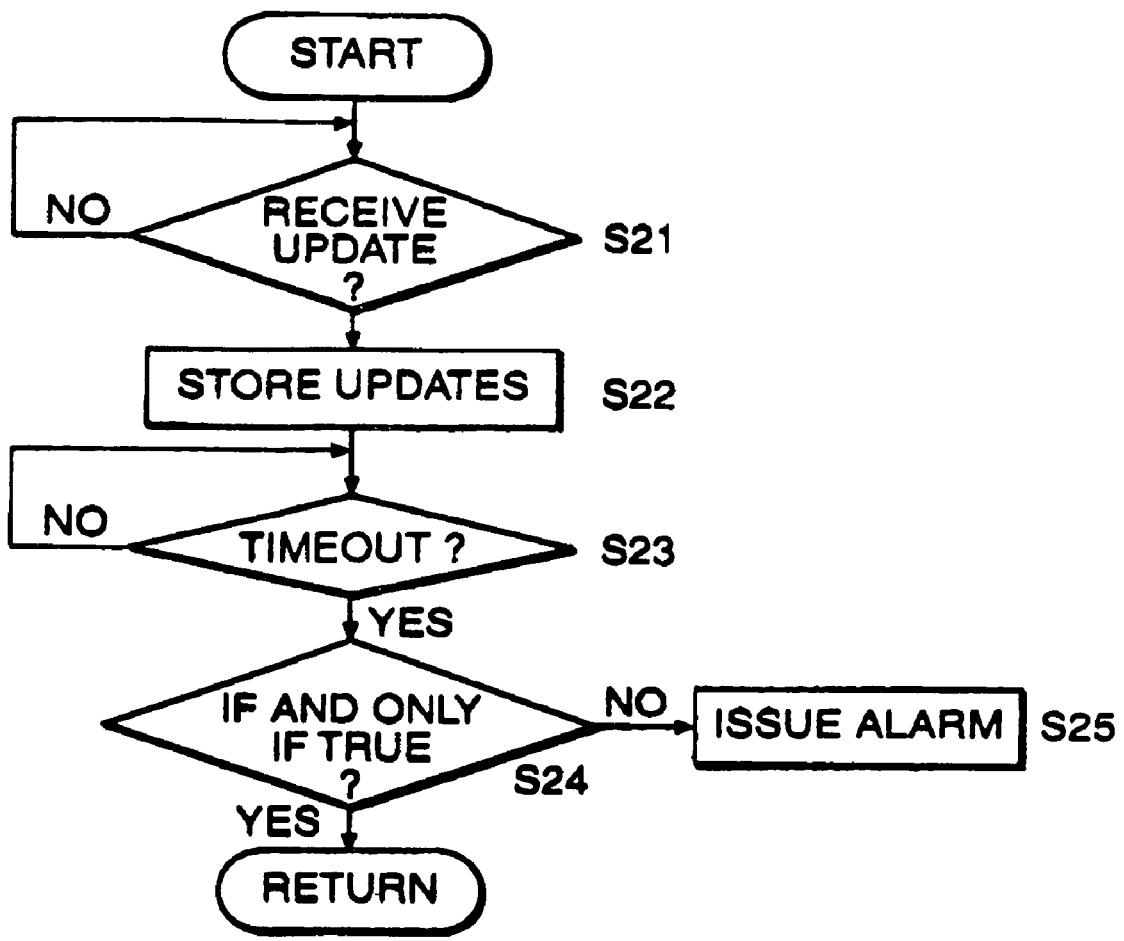
FIG. 6 is a flowchart depicting a method according to the preferred embodiment.

In general, each router processor carries out the steps depicted in FIG. 6 to detect unreliable and/or compromised routers. Bear in mind, however, that these steps could be carried out by a central switch/router or a specially dedicated sentinel processor. In step S21, the router processor in router 10 waits until a router update is received from any one of the routers 12 and 14, for example from router 12. After the router 12 update is received, the router 10 processor stores the update in its internal database in Step S22, time-stamped with a local or globally-synchronized clock. In step S23, the router 10 processor awaits a small, configurable amount of time (such as 1 second, more preferably 10 seconds, even more preferably 60 seconds) in order to ensure that updates from router 12's neighbors (such as router 14) also have time to arrive at router 10.

In step S24, the router 10 processor then inspects all the link-state information received in the router 12 update, and verifies that the "if and only if" statement for each of these links is true. For example, if router 12 reports that the link to router 14 is operational, the most recent update from router 14 must also report that the link to router 12 is also operational. If router 12 reports this link to be non-operational, router 14 must make the same report. Similarly, the router 10 processor checks that router 12 and router 14 have agreed upon the network portion of the IP address for the link, and any other common characteristics of the link.

Note that some neighbors listed in router 12's report may have sent newer reports. Hence, to avoid race conditions, those neighbors must be skipped over in this link check. They will be checked in turn when it comes time to verify the updates from the neighbors (as their own verification timers expire or as their updates are received). If any discrepancy is found in step S24, then router 10 issues an alarm to a management station, intrusion detection terminal, human operator, or other designated entity in step S25. This alarm may include relevant information from the updates which highlight the non-complementary data, the link state and characteristics, and especially the identities of the routers that are issuing reports that disagree. Optionally, before issuing the alarm signal, the router 10 processor may wait some period of time (such as 1 second, preferably 10 seconds, even more preferably 60 seconds) and perform the "if and only if" check again to see if a newer update from either of routers 12 or 14 eliminates the non-complementary data.

When the management entity receives the alarm, as generated in step S25, there is a high likelihood that one of the routers listed in the alarm report is issuing false or unreliable routing information. This node can then be investigated and perhaps removed from the network.

Figure 7:
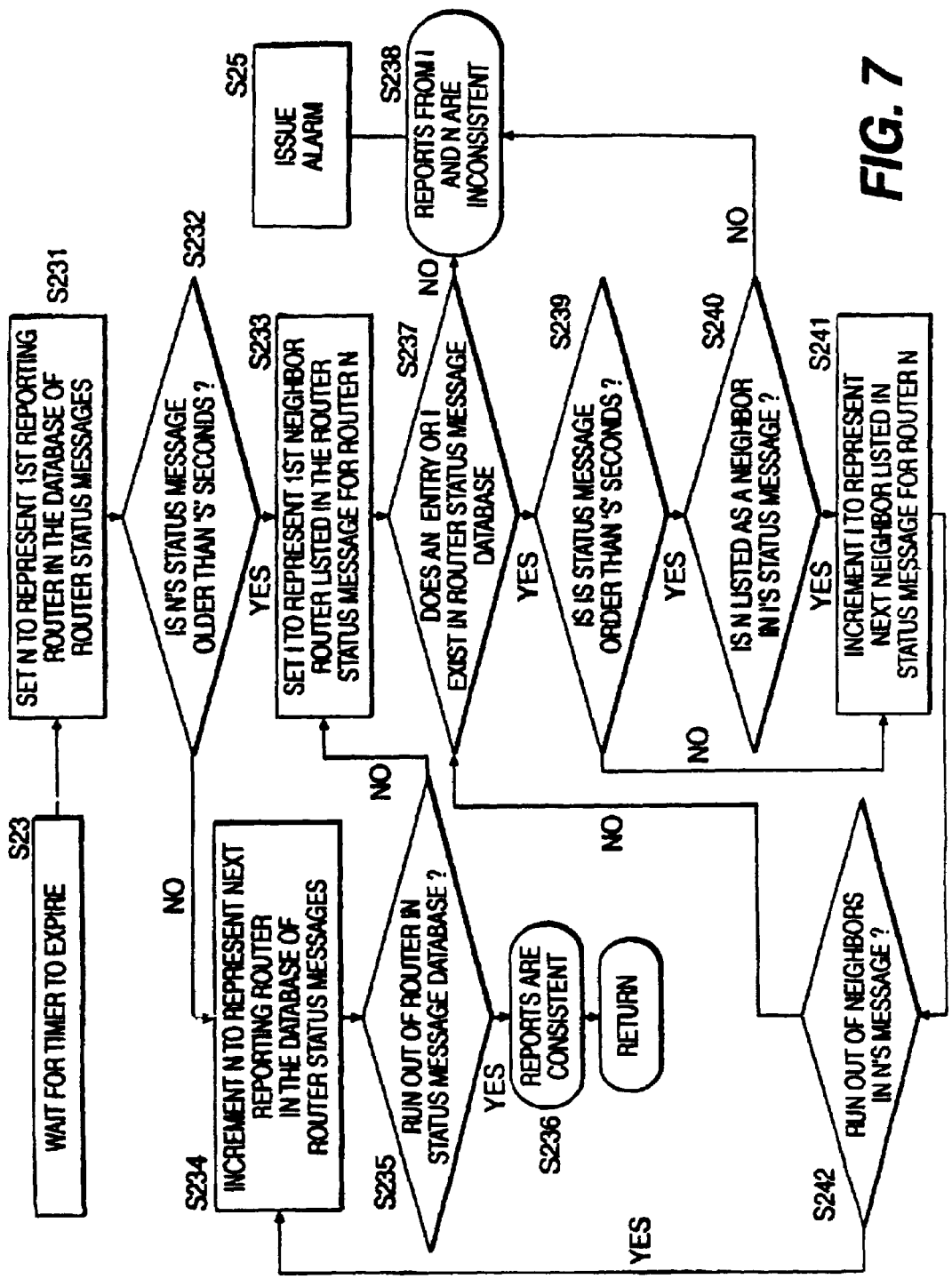
FIG. 7 is a flowchart illustrating the processing carried out in steps S23 and S24 of FIG. 6.

FIG. 7 illustrates, in more detail, the processing carried out within steps S23 and S24 of FIG. 6. The algorithm of FIG. 7 can be executed by each node in the network in a fully distributed manner, or by a small number of "watcher" nodes, etc. In either case, it serves to check whether the router status messages are consistent; that is, if Node A reports Node B as a neighbor if and only if B reports A as a neighbor. If not, the algorithm reports that A and B are inconsistent. If run repeatedly it will find all inconsistent reports in a database. This allows the algorithm to detect all compromised nodes. Note that this flowchart shows how a "settling time" of S seconds should be implemented, since reports arrive asynchronously from different nodes in a network. Thus, as already described in the application, there must be some settling time to allow for these asynchronous arrivals of router status messages; during this settling time, inconsistencies are ignored. The time S may be on the order of milliseconds, or 1, 10, or 60 seconds; even minutes may be used in very large networks.

In FIG. 7, the router or node processor waits to timeout at step S23, and then sets N to represent the first reporting router in the database of Router Status Messages in step S231. In step S232, the processor determines if the router N status message is older than "S" seconds. If greater than "S", the processor sets I to represent the first neighbor router listed in the Router Status Message for router N in step S233. On the other hand, if router N's status message is not older than "S" seconds, the processor proceeds to step S234 where N is incremented to represent the next reporting router in the database of Router Status Messages. In this instance, the processor next determines whether it has run out of routers in the status message database in step S235. If it has run out of such routers, the processor proceeds to step S236 were it reports that the databases are consistent, and the process then returns. If it has not run out of such routers, it proceeds to step S233.

Once the processor has set I to represent the first neighbor router listed in the Router Status Message for the router N in step S233, it proceeds to determine whether an entry for I exists in the Router Status Message database in step S237. If such an entry does not exist, the processor proceeds to step S238 where it determines that the status reports from routers I and N are inconsistent, an alarm may be issued at step S25.

On the other hand, if an entry for router I exists in the Router Status Message database in step S237, the processor goes on to determine if the status message from router I is older than "S" seconds at step S239. If the messages older than "S" seconds, the processor proceeds to determine, at step S240 whether router N is listed as a neighbor in router I's status message. If it is so-listed, the processor proceeds to increment router I to represent the next neighbor listed in the status message for router N at step S241. If, at step S239, the processor determines that router I's status message is not older than "S", it proceeds to step S241. In step S240, if router N is not listed as a neighbor in router I's status message, the processor proceeds to determine that the status messages from routers I and N are inconsistent at step S238.

After the processor has incremented router I to represent the next neighbor listed for router N in step S241, the processor proceeds to step S242 to determine whether it has run out of neighbors listed in router N's message. If it has run out of neighbors, the processor returns to step S234 to increment N to represent the next reporting router. However, if the processor has not run out of neighbors in router N's message, the processor returns to step S237 to determine whether an entry for router I exists in the Router Status Message database.

The same methods described above work equally well in detecting a group of subverted nodes acting in collusion. The link state consistency tests will identify the boundary of the subverted group and raise an alarm.

In another variant of this invention, router 10 itself can decide to excise one or both of the disagreeing routers 12 and 14 from the network. It can do so by simply flagging the routers, in the router 10's internal routing database, as being unreliable and to be ignored. This promptly and automatically repels the information attack, though possibly at the expense of also expelling one or more reliable routers as well. Investigations can then ensue, and the routers found to be operating properly can be brought back into the network.

While the present invention has been described in terms of simple point-to-point links in which only two routers are present on a given link, exactly the same mechanism can be used for the more general case in which a number of routers share a single common communication link (such as an Ethernet or a common RF channel). Two or more of these routers may be configured to issue Link State updates for their neighbor relationship across this link, and the updates from all those present on the link are compared in order to find discrepancies.

This invention provides greater network security against attacks in which an intruder overruns and physically controls an active network router (node) because the intruder must subvert two or more network nodes in a coordinated manner within a very short span of time, which is much harder than subverting a single mode.

Thus, what has been described is apparatus and method for detecting false routing updates issued from a compromised/unreliable router in a network. While the present invention can be incorporated into hardware and firmware, it is particularly suited to distribution by software. Thus, any computer-readable storage medium (such as diskettes, CD-ROM's, optical media, magnetic media, etc.) may be used to store code for distribution to the nodes of a wired or wireless network. The code causes one or more router processors to carry out the methods described above. Note, also, that the software for incorporating the above-described features into network nodes may be distributed to the router processors by wired or wireless communication.

The individual components shown in outline or designated by blocks in the Drawings are all well-known in the communication arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Apparatus for detecting whether link status information sent from a first router is unreliable, comprising:
    a memory for storing a router status database; and
    a processor which (i) receives a first signal corresponding to a first router status message sent by the first router, the first router status message containing link status information indicative of the status of communication between the first router and a second router, (ii) compares the received first signal with a second signal stored in said router status database, the second signal corresponding to a second router status message sent by the second router containing link status information indicative of the status of communication between the second router and the first router, and (iii) issues an alarm signal that indicates that the signal comparison reveals that the first and second router status messages are inconsistent.

2. Apparatus according to claim 1, wherein said apparatus is incorporated into the second router.

3. Apparatus according to claim 1, wherein said processor waits a predetermined period of time after receiving the first signal before performing the signal comparison.

4. Apparatus according to claim 1, wherein the processor performs the signal comparison by deter if both the first and second signals indicate that the link between the first and second routers is operational.

5. Apparatus according to claim 1, wherein said processor, after the signal comparison, (i) waits a predetermined period of time, (ii) receives renewed first and second signals, and (iii) reperforms the signal comparison on the basis of the renewed fast and second signals.

6. Apparatus according to claim 1, wherein the processor issues the alarm signal in a third router status message transmitted to at least the second router.

7. Apparatus for detecting false routing updates issued from a compromised router, comprising:
    a memory which stores a router database that contains an entry corresponding to a router update received from another router and indicating the link status between the another router and the compromised router; and
    a processor which (i) receives a signal corresponding to a router update received from the compromised router and indicating the link status between the compromised router and the another router, (ii) compares the received signal with the entry stored in the router database, and (iii) issues an alarm signal that indicates that the received signal and the database entry are inconsistent.

8. Apparatus according to claim 7, wherein said processor issues a router update if said processor determines that the received signal and the database entry contain complementary link status information regarding the link between the compromised router and the another router.

9. Apparatus according to claim 7, further comprising a receiver for receiving the router update from the compromised router, and a transmitter for transmitting the alarm signal.

10. Apparatus according to claim 7, wherein said apparatus comprises the another router.

11. A method for detecting whether link status information sent from a first router is unreliable, comprising the steps of:
storing a router status database;
receiving a first signal corresponding to a first router status message sent by the first router, the first router status message containing link status information indicative of the status of communication between the first router and a second router;
comparing the received first signal with a second signal stored in said router status database, the second signal corresponding to a second router status message sent by the second router, the second router status message containing link status information indicative of the status of communication between the second router and the first router; and
issuing an alarm signal that indicates that the signal comparison reveals that the first and second router status messages are inconsistent.

12. A method according to claim 11, wherein said method is performed in the second router.

13. A method according to claim 11, further comprising the step of waiting a predetermined period of time after receiving the first signal before performing the signal comparison.

14. A method according to claim 11, wherein the signal comparison is performed by determining if both the first and second signals indicate that the link between the first and second routers is operational.

15. A method according to claim 11, further comprising the steps of, after the signal comparison:
waiting a predetermined period of time;
receiving renewed first and second signals; and
reperforming the signal comparison on the basis of the renewed first and second signals.

16. A method according to claim 11, wherein the step of issuing the alarm signal comprises the step of issuing the alarm signal in a third router status message transmitted to at least the second router.

17. A method for detecting false routing updates issued from a compromised router, comprising the steps of:
storing a router database that contains an entry corresponding to a router update received from another router and indicating a link status between the another router and the compromised router;
receiving a signal corresponding to a router update received from the compromised router and indicating a link status between the compromised router and the another router;
comparing the received signal with the entry stored in the router database; and
issuing an alarm signal that indicates that the received signal and the database are inconsistent.

18. A method according to claim 17, further comprising the step of issuing a router update if said processor determines that the received signal and the database entry with respect to the link between the compromised router and the another router.

19. A method according to claim 17, further comprising the step of broadcasting the alarm signal.

20. A method according to claim 17, wherein said steps are performed in the another router.

21. A storage medium containing computer-readable code which causes one or more router processors to perform a method for detecting whether link status information sent from a first router is unreliable, the computer-readable code causing the one or more router processors to perform the functions of:
storing a router status database;
receiving a first signal corresponding to a first router status message sent by the first router, the first router status message containing link status information indicative of the status of communication between the first router and a second router;
comparing the received first signal with a second signal stored in said router status database, the second signal corresponding to a second router status message sent by the second router, the second router status message containing link status information indicative of the status of communication between the second router in the first router; and
issuing an alarm signal that indicates that the signal comparison reveals that the first and second router status messages are inconsistent.

22. A storage medium containing computer-readable code which causes one or more router processors to perform a method for detecting false routing updates issued from a compromised router, the computer-readable code causing the one or more router processors to perform the functions of:
storing a router database that contains an entry corresponding to a router update received from another router and indicating the link status between the another router and the compromised router;
receiving a signal corresponding to a router update received from the compromised router and indicating the link status between the compromised router and the another router;
comparing the received signal with the entry stored in the router database; and
issuing an alarm signal that indicates that the received signal and the database entry are inconsistent.

23. Apparatus for detecting whether link status information sent from a first router is unreliable, comprising:
means for storing a router status database; and
means for (i) receiving a first signal corresponding to a first router status message sent by the first router, the first router status message containing link status information indicative of the status of communication between the first router and a second router, (ii) comparing the received first signal with a second signal stored in said router status database, the second signal corresponding to a second router status message sent by the second router, the second router status message containing link status information indicative of the status of communication between the second router in the first router, and (iii) issuing an alarm signal that indicates that the signal comparison reveals that the first and second router status messages are inconsistent.

* * * * *